US012122178B2

(12) United States Patent
Sambhy et al.

(10) Patent No.: US 12,122,178 B2
(45) Date of Patent: Oct. 22, 2024

(54) IMAGING BLANKET AND VARIABLE DATA LITHOGRAPHY SYSTEM EMPLOYING THE IMAGING BLANKET

(71) Applicant: XEROX CORPORATION, Norwalk, CT (US)

(72) Inventors: Varun Sambhy, Penfield, NY (US); Gary D. Redding, Victor, NY (US); Santokh S. Badesha, Pittsford, NY (US); Peter J. Nystrom, Webster, NY (US); Lina Bian, Dracut, MA (US)

(73) Assignee: XEROX CORPORATION, Norwalk, CT (US)

( * ) Notice: Subject to any disclaimer, the term of this patent is extended or adjusted under 35 U.S.C. 154(b) by 749 days.

(21) Appl. No.: 16/296,045

(22) Filed: Mar. 7, 2019

(65) Prior Publication Data

US 2020/0282759 A1 Sep. 10, 2020

(51) Int. Cl.
*B41N 10/04* (2006.01)
*B41C 1/10* (2006.01)
*B41F 3/34* (2006.01)

(52) U.S. Cl.
CPC ............ *B41N 10/04* (2013.01); *B41C 1/1066* (2013.01); *B41F 3/34* (2013.01); *B41N 2210/14* (2013.01); *B41P 2200/22* (2013.01)

(58) Field of Classification Search
None
See application file for complete search history.

(56) References Cited

U.S. PATENT DOCUMENTS

| | | | |
|---|---|---|---|
| 2003/0233953 A1 | 12/2003 | Pan et al. | |
| 2005/0084640 A1* | 4/2005 | Bilodeau | B32B 7/12 428/40.1 |
| 2012/0103212 A1 | 5/2012 | Stowe et al. | |
| 2014/0060359 A1 | 3/2014 | Kanungo et al. | |
| 2016/0236500 A1 | 8/2016 | Fu et al. | |
| 2017/0341452 A1 | 11/2017 | Kanungo et al. | |

FOREIGN PATENT DOCUMENTS

| | | |
|---|---|---|
| EP | 1428673 A1 | 6/2004 |
| EP | 3248804 A1 | 11/2017 |
| EP | 3285121 A2 | 2/2018 |
| JP | 2002337472 A | 11/2002 |

OTHER PUBLICATIONS

Sambhy et al., "Multi-Layer Blanket," U.S. Appl. No. 15/959,856, filed Apr. 23, 2018.
Extended European Search Report issued Jul. 20, 2020 in corresponding European Application No. 20160809.8, 7 pages.

* cited by examiner

*Primary Examiner* — Joshua D Zimmerman
(74) *Attorney, Agent, or Firm* — MH2 Technology Law Group LLP

(57) ABSTRACT

An imaging blanket comprises a base comprising an elastic polymer and sulfur. A barrier layer is on the base and a surface layer is on the barrier layer. The surface layer comprises an elastomer and a platinum catalyst.

19 Claims, 3 Drawing Sheets

IMAGING BLANKET AND VARIABLE DATA LITHOGRAPHY SYSTEM EMPLOYING THE IMAGING BLANKET

BACKGROUND

Field of Use

The disclosure relates to marking and printing systems, and more specifically to an image transfer element of such a system.

Background

Offset lithography is a common method of printing today. Conventional lithographic and offset printing techniques utilize plates which are permanently patterned with an image to be printed (or its negative), and are therefore useful only when printing a large number of copies of the same image (long print runs), such as magazines, newspapers, and the like. These methods do not permit printing a different pattern from one page to the next (referred to herein as variable printing) without removing and replacing the print cylinder and/or the imaging plate (e.g., the technique cannot accommodate true high speed variable printing wherein the image changes from impression to impression, for example, as in the case of digital printing systems).

Efforts have been made to create lithographic and offset printing systems for variable data. One example is disclosed in U.S. Patent Application Publication No. 2012/0103212 A1 (the '212 Publication) published May 3, 2012, and based on U.S. patent application Ser. No. 13/095,714, which is commonly assigned, and the disclosure of which is hereby incorporated by reference herein in its entirety, in which an intense energy source such as a laser is used to pattern-wise evaporate a fountain solution. The '212 publication discloses a family of variable data lithography devices that use a structure to perform both the functions of a traditional imaging plate and of a traditional blanket to retain a patterned fountain solution of dampening fluid for inking, and to delivering that ink pattern to a substrate. A blanket performing both of these functions is referred to herein as an imaging blanket.

Imaging blankets employ a seamless engineered rubber substrate, such as, for example, a substrate known as a carcass. As an example, U.S. Patent Application Publication No. 2017/0341452 employs a sulfur free carcass for use in an imaging blanket. However, other types of carcass are available, including existing carcass used in the litho/flexo industry that are based on NBR (nitrile butadiene rubber). These NBR rubber carcass have sulfur which is used as a crosslinker. Because these NBR rubber carcass are inexpensive, it would be desirable to employ them as a substrate for an imaging blanket.

SUMMARY

An embodiment of the present disclosure is directed to an imaging blanket. The imaging blanket comprises: a base comprising an elastic polymer and sulfur; a barrier layer on the base; and a surface layer on the barrier layer. The surface layer comprises an elastomer and a platinum catalyst.

Another embodiment of the present disclosure is directed to a variable data lithography system comprising an imaging member. The imaging member comprises an imaging blanket. The imaging blanket comprises: a base comprising a top layer, the top layer comprising an elastic polymer and sulfur; a barrier layer on the top layer; and a surface layer on the barrier layer. The surface layer comprises an elastomer and a platinum catalyst. The variable data lithography system further comprises a fountain solution subsystem configured for applying a layer of fountain solution to the surface layer; a patterning subsystem configured for selectively removing portions of the fountain solution layer so as to produce a latent image in the fountain solution; an inking subsystem configured for applying ink over the imaging blanket such that said ink selectively occupies regions of the imaging blanket where fountain solution was removed by the patterning subsystem to thereby produce an inked latent image; and an image transfer subsystem configured for transferring the inked latent image to a substrate.

Yet another embodiment of the present disclosure is directed to a method of making an imaging blanket. The method comprises providing a base comprising a top layer, the top layer comprising an elastic polymer and sulfur. A barrier layer is deposited on the top layer. An elastomer resin is deposited on the barrier layer, the elastomer resin comprising a platinum catalyst. The elastomer resin is cured to form a surface layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
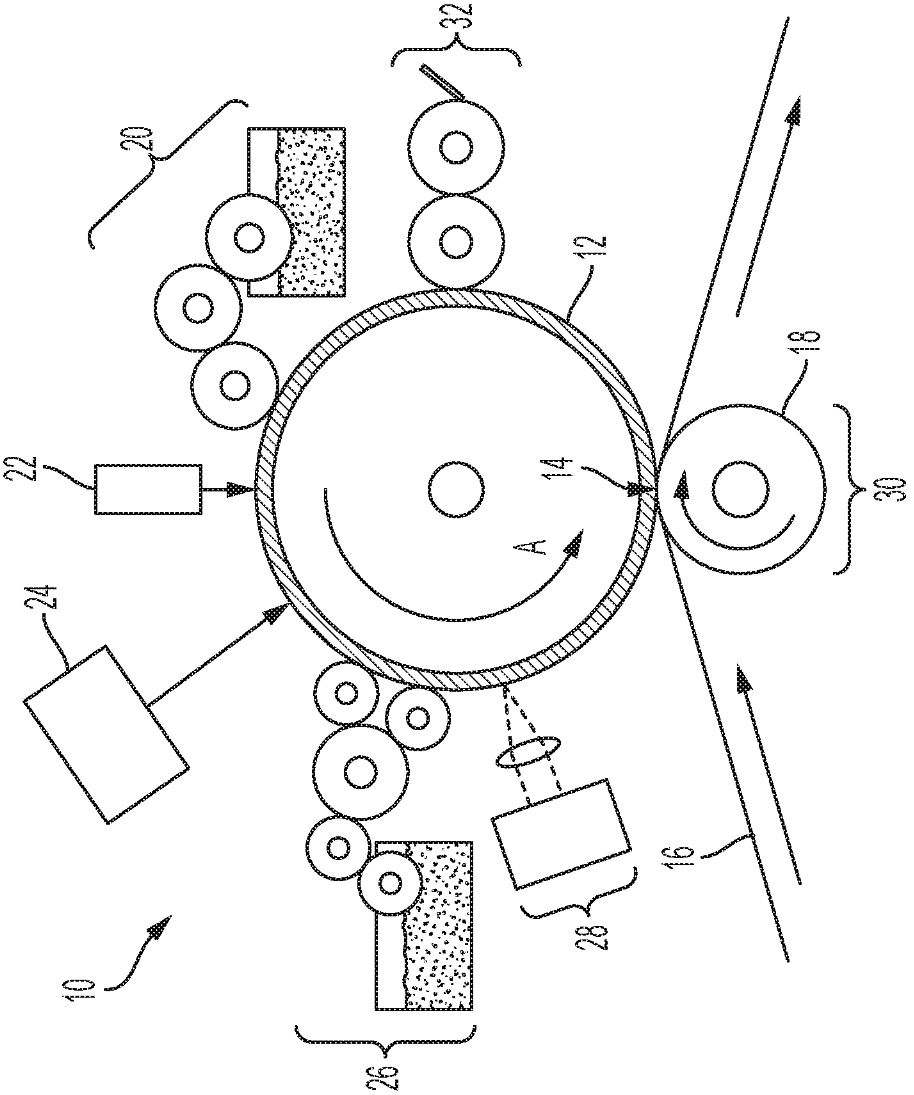
FIG. 1 RELATED ART
FIG. 1 is a side view of a variable data lithography system according to various embodiments disclosed herein.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” The term “at least one of” is used to mean one or more of the listed items can be selected.

All ranges disclosed herein are to be understood to encompass any and all sub-ranges subsumed therein. For example, a range of “less than 10” can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as “less than 10” can assume negative values, e.g. −1, −2, −3, −10, −20, −30, etc.

Although embodiments of the disclosure herein are not limited in this regard, the terms “plurality” and “a plurality” as used herein may include, for example, “multiple” or “two or more.” The terms “plurality” or “a plurality” may be used throughout the specification to describe two or more components, devices, elements, units, parameters, or the like. For example, “a plurality of resistors” may include two or more resistors.

The term “silicone” is well understood to those of skill in the relevant art and refers to polyorganosiloxanes having a backbone formed from silicon and oxygen atoms and sidechains containing carbon and hydrogen atoms. For the purposes of this application, the term “silicone” should also be understood to exclude siloxanes that contain fluorine atoms, while the term “fluorosilicone” is used to cover the class of siloxanes that contain fluorine atoms. Other atoms may be present in the silicone rubber, for example nitrogen atoms in amine groups which are used to link siloxane chains together during cross-linking.

The term “fluorosilicone” as used herein refers to polyorganosiloxanes having a backbone formed from silicon and oxygen atoms, and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit addition cross-linking. When the cross-linking is complete, such groups become part of the backbone of the overall fluorosilicone. The side chains of the polyorganosiloxane can also be alkyl or aryl. Fluorosilicones are commercially available, for example CF1-3510 from NuSil or SLM (n−27) from Wacker.

The terms “media substrate”, “print substrate” and “print media” generally refers to a usually flexible physical sheet of paper, polymer, Mylar material, plastic, or other suitable physical print media substrate, sheets, webs, etc., for images, whether precut or web fed.

The term “printing device” or “printing system” as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A “printing system” may handle sheets, webs, substrates, and the like. A printing system can place marks on any surface, and the like, and is any machine that reads marks on input sheets; or any combination of such machines.

All physical properties that are defined hereinafter are measured at 20° C. to 25° C. unless otherwise specified. The term “room temperature” refers to 25° C. unless otherwise specified.

While the fluorosilicone composition is discussed herein in relation to ink-based digital offset printing or variable data lithographic printing systems, embodiments of the fluorosilicone composition, or methods of manufacturing imaging members using the same, may be used for other applications, including printing applications other than ink based digital offset printing or variable data lithographic printing systems.

Many of the examples mentioned herein are directed to an imaging blanket (including, for example, a printing sleeve, belt, imaging blanket employed on a drum, and the like) that has a uniformly grained and textured blanket surface that is ink-patterned for printing. In a still further example of variable data lithographic printing, such as disclosed in the ’212 Publication, a direct central impression printing drum having a low durometer polymer imaging blanket can be employed, over which for example, a latent image may be formed and inked.

FIG. 1 depicts a variable data lithography printing system 10. A general description of the exemplary system 10 shown in FIG. 1 is provided here. Additional details regarding individual components and/or subsystems shown in the exemplary system 10 of FIG. 1 may be found in the ’212 Publication. As shown in FIG. 1, the exemplary system 10 may include an imaging member 12 used to apply an inked image to a target image receiving media substrate 16 at a transfer nip 14. The transfer nip 14 is produced by an impression roller 18, as part of an image transfer mechanism 30, exerting pressure in the direction of the imaging member 12.

The imaging member 12 may include a reimageable surface layer or plate formed over a structural mounting layer that may be, for example, a cylindrical core, or one or more structural layers over a cylindrical core. A fountain solution subsystem 20 may be provided generally comprising a series of rollers, which may be considered as dampening rollers or a dampening unit, for uniformly wetting the reimageable surface with a layer of dampening fluid or fountain solution, generally having a uniform thickness, to the reimageable surface of the imaging member 12. Once the dampening fluid or fountain solution is metered onto the reimageable surface, a thickness of the layer of dampening fluid or fountain solution may be measured using a sensor 22 that provides feedback to control the metering of the dampening fluid or fountain solution onto the reimageable surface.

An optical patterning subsystem 24 may be used to selectively form a latent image in the uniform fountain solution layer by image-wise patterning the fountain solution layer using, for example, laser energy. It is advantageous to form the reimageable surface of the imaging member 12 from materials that should ideally absorb most of the IR or laser energy emitted from the optical patterning subsystem 24 close to the reimageable surface. Forming the surface of such materials may advantageously aid in substantially minimizing energy wasted in heating the fountain solution and coincidentally minimizing lateral spreading of heat in order to maintain a high spatial resolution capability. Briefly, the application of optical patterning energy from the optical patterning subsystem 24 results in selective evaporation of portions of the uniform layer of fountain solution in a manner that produces a latent image.

The patterned layer of fountain solution having a latent image over the reimageable surface of the imaging member 12 is then presented or introduced to an inker subsystem 26. The inker subsystem 26 is usable to apply a uniform layer of ink over the patterned layer of fountain solution and the reimageable surface of the imaging member 12. In embodiments, the inker subsystem 26 may use an anilox roller to meter an ink onto one or more ink forming rollers that are in contact with the reimageable surface of the imaging member 12. In other embodiments, the inker subsystem 26 may include other traditional elements such as a series of metering rollers to provide a precise feed rate of ink to the reimageable surface. Ink from the inker subsystem 26 will adhere to the areas of the reimageable surface that do not have fountain solution thereon to form an ink image, while ink deposited on the areas of the reimageable surface on which the fountain solution layer remains will not adhere to the reimageable surface.

Cohesiveness and viscosity of the ink residing on the reimageable plate surface may be modified by a number of mechanisms, including through the use of some manner of rheology control subsystem 28. In embodiments, the rheology control subsystem 28 may form a partial cross-linking core of the ink on the reimageable plate surface to, for example, increase ink cohesive strength relative to an adhesive strength of the ink to the reimageable plate surface. In embodiments, certain curing mechanisms may be employed. These curing mechanisms may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable surface of imaging member 12 to media substrate 16 using the transfer subsystem 30. With the adhesion and/or cohesion of the ink having been modified by the rheology control system 28, modified adhesion and/or cohesion of the ink causes the ink to transfer substantially completely, preferentially adhering to the media substrate 16 as it separates from the reimageable surface of the imaging member 12 at the transfer nip 14. Careful control of the temperature and pressure conditions at the transfer nip 14, among other things, may allow transfer efficiencies for the ink from the reimageable plate surface of the imaging member 12 to the media substrate 16 to exceed, for example, 95%. While it is possible that some fountain solution may also wet substrate 16, the volume of such transferred fountain solution will generally be minimal so as to rapidly evaporate or otherwise be absorbed by the substrate 16.

Finally, a cleaning system 32 is provided to remove residual products, including non-transferred residual ink and/or remaining fountain solution from the reimageable surface in a manner that is intended to prepare and condition the reimageable surface of the imaging member 12 to repeat the above cycle for image transfer. An air knife may be employed to remove residual fountain solution. It is anticipated, however, that some amount of ink residue may remain. Removal of such remaining ink residue may be accomplished by cleaning subsystem 32. The cleaning subsystem 32 may include, for example, at least a first cleaning member, such as a sticky or tacky member, in physical contact with the reimageable surface of the imaging member 12, where the sticky or tacky member removes residual ink and any remaining small amounts of surfactant compounds from the fountain solution of the reimageable surface of the imaging member 12. The sticky or tacky member may then be brought into contact with a smooth roller to which residual ink may be transferred from the sticky or tacky member, the ink being subsequently stripped from the smooth roller by, for example, a doctor blade. Any other suitable cleaning system can be employed.

Regardless of the type of cleaning system used, cleaning of the residual ink and fountain solution from the reimageable surface of the imaging member 12 can prevent or reduce the risk of a residual image from being printed in the proposed system. Once cleaned, the reimageable surface of the imaging member 12 is again presented to the fountain solution subsystem 20 by which a fresh layer of fountain solution is supplied to the reimageable surface of the imaging member 12, and the process is repeated.

Figure 2:
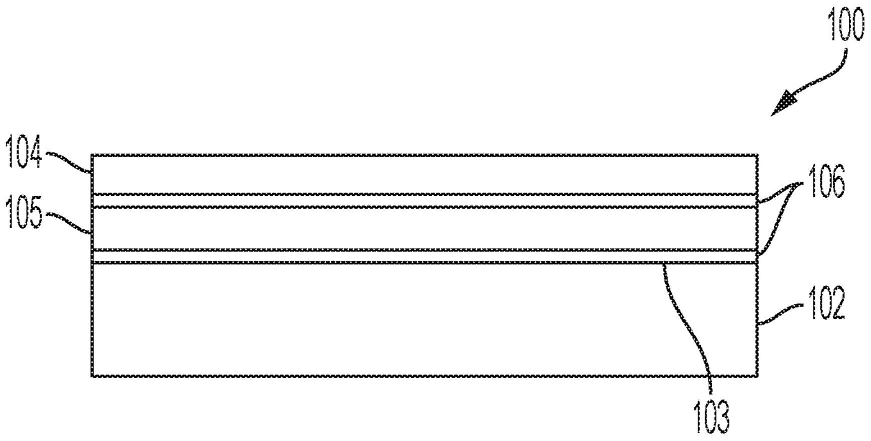
FIG. 2 is a side diagrammatical view of a multilayer imaging blanket according to various embodiments disclosed herein.

FIG. 2 illustrates a cross-sectional view of a portion of an imaging blanket 100 for use with an imaging member, such as, for example, as part of imaging member 12. For example, imaging member 12 can be in the form of a printing cylinder or drum on which the imaging blanket 100 is inserted as part of a printing sleeve. Printing sleeves and printing cylinders or drums are generally well known in the art. Imaging blanket 100 comprises a base 102 comprising an elastic polymer layer and sulfur. The elastic polymer layer and sulfur can be at or sufficiently near the topmost surface 103 of the base 102 so that sulfur is capable of diffusing from the base 102 into adjacent layers formed on the topmost surface 103. A barrier layer 105 is disposed on the base 102. A surface layer 104 is disposed on the barrier layer 105, the surface layer 104 comprising an elastomer and a platinum catalyst. Optional primer layers 106 can be disposed between one or both of: (i) the base 102 and the barrier layer 105 and (ii) the barrier layer 105 and the surface layer 104.

The base 102 can be a single layer or a multilayer base that is configured in any suitable manner for use with the imaging member 12. At least one layer of the base comprises an elastic polymer and sulfur. An example of one such elastic polymer is nitrile butadiene rubber, which employs sulfur as a cross-linker.

The barrier layer 105 comprises any material that can sufficiently block sulfur diffusion to other layers and that is otherwise suitable for use as part of imaging blanket 100. An example of a suitable material is an epoxy polymer. One part or two part epoxy formulations can be employed. It is believed that cross-linking of the epoxy may increase the effectiveness of the barrier layer 105 for inhibiting or reducing the diffusion of sulfur. Therefore, in an embodiment, the epoxy is a cross-linked epoxy.

The barrier layer 105 can have any thickness that can sufficiently block sulfur. As an example, the thickness can range from about 5 microns to about 100 microns, such as about 5 microns to about 80 microns, or about 10 microns to about 60 microns, or about 10 microns to about 50 microns, or about 10 microns to about 25 microns.

The surface layer 104 comprises an elastomer, such as a fluorosilicone elastomer, which is cured using a platinum catalyst. After curing, the platinum catalyst remains as a part of the surface layer 104. Examples of suitable fluorosilicone elastomers are described in greater detail below.

Without the barrier layer 105, sulfur from the underlying base 102 can diffuse into the surface layer 104 during curing and inhibit or reduce the ability of the surface layer 104 to cross-link. Insufficient cross-linking is problematic in that it can cause the surface layer 104 to lack structural integrity. By inhibiting or reducing the diffusion of sulfur into the surface layer 104 during curing, the barrier layer 105 allows the elastomer of the surface layer 104 to sufficiently cross-link, thereby preventing or reducing such problems.

The surface layer 104 further includes an infrared absorbing material. Any suitable infrared absorbing material can be employed, such as one or more materials selected from the group consisting of carbon black, a metal oxide such as iron oxide (FeO), carbon nanotubes, graphene, graphite, and carbon fibers. The IR absorbing filler may have an average particle size of from about 2 nanometers (nm) to about 10 μm. In an embodiment, the IR absorbing filler may have an average particle size of from about 20 nm to about 5 μm. In another embodiment, the filler has an average particle size of about 100 nm. In embodiments, the IR absorbing filler is carbon black. In an embodiment, the IR absorbing filler is a low-sulphur carbon black, such as Emperor 1600 (available from Cabot). In an embodiment, a sulphur content of the carbon black is 0.3% or less. In an embodiment, the sulphur content of the carbon black is 0.15% or less.

In an embodiment, the surface layer 104 also comprises silica. For example, the surface layer 104 can include about 1 weight percent to about 5 weight percent silica based on the total weight of the surface layer composition. In another embodiment, the surface layer includes about 1 weight percent to about 4 weight percent silica. In yet another embodiment, the surface layer includes about 1.15 weight percent silica based on the total weight of the surface layer composition. The silica may have an average particle size of from about 10 nm to about 0.2 μm. In one embodiment, the silica may have an average particle size of from about 50 nm to about 0.1 μm. In another embodiment, the silica has an average particle size of about 20 nm.

In an embodiment, the surface layer 104 may have a thickness of about 10 microns (μm) to about 1 millimeter (mm), depending on the requirements of the overall printing system. In other embodiments, the imaging member surface layer has a thickness of about 20 μm to about 200 μm. In one embodiment, the thickness of the surface layer is of about 40 μm to about 60 μm. In another embodiment, the thickness of the surface layer is of about 80 μm to about 150 μm In an embodiment, the surface layer may have a surface energy of 22 dynes/cm or less with a polar component of 5 dynes/cm or less. In other embodiments, the surface layer has a surface energy of 21 dynes/cm or less with a polar component of 2 dynes/cm or less or a surface energy of 19 dynes/cm or less with a polar component of 1 dyne/cm or less.

Optional primer layers 106 can comprise any suitable material that improves the adhesion between the layers. An example of a primer material is siloxane. In an embodiment, primer layer 106 comprises octamethyl trisiloxane (e.g., S11 NC commercially available from Henkel). In addition an inline corona treatment can be applied to the base 102 and/or primer layer 106 for further improved adhesion, as readily understood by a skilled artisan. Such inline corona treatments may increase the surface energy and adhesion of the imaging blanket layers.

The primer layer thickness can range from about 0.01 microns to about 2 microns, such as about 0.1 microns to about 1.5 micron, or about 0.5 microns to about 1 micron. The primer layer is not thick enough to effectively block sulfur from the surface layer 104.

Figure 3:
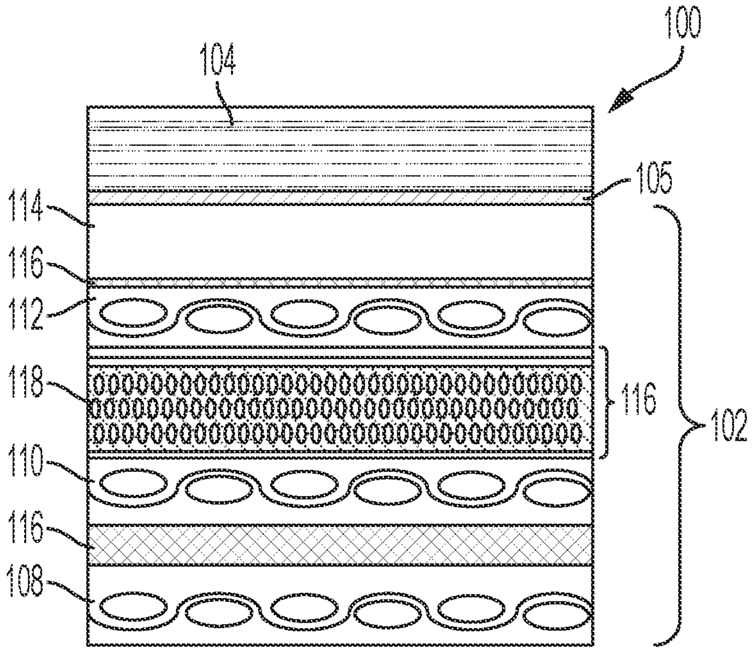
FIG. 3 is a side diagrammatical view of a multilayer imaging blanket according to various additional embodiments disclosed herein.

FIG. 3 depicts an imaging blanket for a variable data lithography printing system, according to an embodiment of the present disclosure. The imaging blanket is a multilayer blanket 100 having a base 102, a surface layer 104 and a barrier layer 105 there between. The base 102 is a carcass at the interior of the imaging blanket intentionally designed to support the surface layer 104.

The base 102 may comprise a multilayer carcass including a bottom fabric layer 108, a center fabric layer 110 on the bottom fabric layer 108, a top fabric layer 112 above the center fabric layer 110, and a top base layer 114 above the top fabric layer 112. In addition, the multilayer carcass of the base 102 may include binding layers 116 on opposite sides of the center fabric layer 110, with one of the binding layers 116 coupling the bottom fabric layer 108 and the center fabric layer 110, and the second one of the binding layers 116 coupling the center fabric layer 110 and the top fabric layer 112. One or both binding layers 116 may include a compressible rubber layer 118.

The bottom fabric layer 108 may be a woven fabric (e.g., cotton, cotton and polyester, polyester) with a lower contacting surface configured to directly or indirectly contact a printing cylinder (not shown). The multilayer imaging blanket is positioned around the printing cylinder to form, for example, imaging member 12. The center fabric layer 110 may also be a woven fabric like the bottom fabric layer 108. Both center fabric layer 110 and bottom fabric layer 108 may have a substance value in a range between 150-250 g/m$^2$. The top fabric layer 112 may comprise polyester, polyethylene, polyamide, fiberglass, polypropylene, vinyl, polyphenylene, sulphide, aramids, cotton fiber or any combination thereof, preferably with a thickness value of 35-45 mm and a substance value of 80-90 g/m$^2$.

Each of the binding layers 116 includes an adhesive layer adjacent at least one of the fabric layers 108, 110, 112, that may be made of a polymeric adhesive rubber preferably based on nitrile butadiene rubber, which optionally contains sulfur. The compressible rubber layer 118 may be made of a polymeric foam preferably with nitrile butadiene rubber modified by adding an expansion agent. Layer 118 may optionally comprise sulfur, such as where the polymeric foam with nitrile butadiene rubber includes sulfur.

The top base layer 114 comprises an elastic polymer (e.g., a rubber) material comprising sulfur. The sulfur can be employed as a cross-linker. An example of a suitable elastic polymer is nitrile butadiene rubber employing sulfur as a cross-linker.

Prior to the application of barrier layer 105 on the top base layer 114 of the base 102, a primer layer (not shown in FIG. 3) can optionally be applied to the top base layer 114 to improve interlayer adhesion between the base 102 and the barrier layer 105. An example of the primer in the primer layer 106 is a siloxane based primer with the main component being octamethyl trisiloxane (e.g., S11 NC commercially available from Henkel). Optionally, a primer layer 106 can be applied between barrier layer 105 and surface layer 104. In addition, an inline corona treatment can be applied to the base 102, barrier layer 105 and/or the optional primer layers 106 for further improved adhesion, as readily understood by a skilled artisan. Such inline corona treatments may increase the surface energy and adhesion of the imaging blanket layers.

The barrier layer 105 comprises any material that can sufficiently block sulfur diffusion to other layers during curing and that is otherwise suitable for use as part of imaging blanket 100. Any of the barrier layer materials described herein can be employed as the barrier layer 105 of FIG. 3. The barrier layer 105 can have any thickness that can sufficiently block sulfur at the curing conditions, including any of the barrier layer thicknesses described herein.

The surface layer 104 of FIG. 3 can employ any suitable elastomer material cured using a platinum catalyst and that functions effectively as an imaging member surface layer. In an embodiment, the elastomer is a fluorosilicone elastomer.

In an embodiment, the surface layer 104, as illustrated in both FIGS. 2 and 3, comprises fluorosilicone materials manufactured from a first part and a second part. The first part (Part A) may include fluorosilicone, an IR absorbing filler, silica and a solvent. The second part (Part B) may include a platinum catalyst having vinyl groups, a cross-linker having hydrosilane groups, a solvent and an inhibitor. The ratio molar ratio of vinyl groups to hydrosilane groups in Part B is about 1:1.

The fluorosilicone of part A may include a vinyl terminated trifluoropropyl methylsiloxane polymer (e.g., Wacker 50330, SML (n=27)) and is illustrated below in Formula 1.

Formula 1

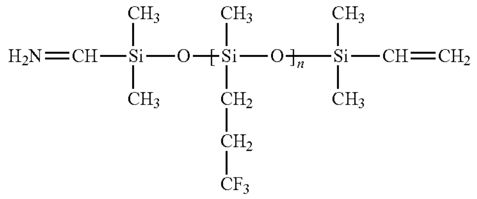

where n can be in range from 10 to 100, or from 15 to 90 or from 18 to 80.

In embodiments, the IR absorbing filler of Part A may be one or more fillers selected from the group consisting of carbon black, a metal oxide such as iron oxide (FeO), carbon nanotubes, graphene, graphite, or carbon fibers. The IR absorbing filler may have an average particle size of from about 2 nanometers (nm) to about 10 μm. In an embodiment, the IR absorbing filler may have an average particle size of from about 20 nm to about 5 μm. In another embodiment, the filler has an average particle size of about 100 nm. In embodiments, the IR absorbing filler is carbon black. In an embodiment, the IR absorbing filler is a low-sulphur carbon black, such as Emperor 1600 (available from Cabot). In an embodiment, a sulphur content of the carbon black is 0.3% or less. In an embodiment, the sulphur content of the carbon black is 0.15% or less.

In embodiments, the Part A includes silica. For example, in one embodiment, the Part A includes between 1 weight percent and 5 weight percent silica based on the total weight of the surface layer composition. In another embodiment, the surface layer includes between 1 weight percent and 4 weight percent silica. In yet another embodiment, the surface layer includes about 1.15 weight percent silica based on the total weight of the surface layer composition. The silica may have an average particle size of from about 10 nm to about 0.2 μm. In one embodiment, the silica may have an average particle size of from about 50 nm to about 0.1 μm. In another embodiment, the silica has an average particle size of about 20 nm.

In embodiments, the solvent of Part A may be butyl acetate, trifluorotoluene, toluene, benzene, methylethylketone, methyl isobutyl ketone, ethyl acetate, propyl acetate, amyl acetate, hexyl acetate and mixtures thereof.

Part B may include a platinum catalyst having vinyl groups. An example of a platinum (Pt) catalyst is illustrated in Formula 2 below.

Formula 2

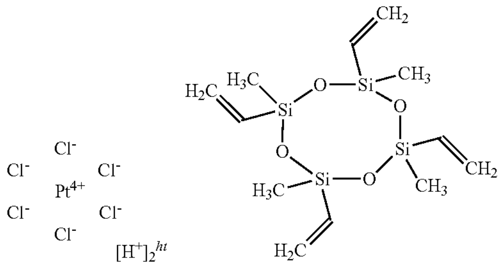

As shown in Formula 2, the platinum catalyst has vinyl groups.

Part B includes a cross-linker (e.g., trifluoropropyl methylsiloxane polymer having hydrosilane groups). In some embodiments, the surface layer composition includes fluorosilicone cross-linker. In one embodiment, the cross-linker is a XL-150 cross-linker from NuSil Corporation. In one embodiment, the cross-linker is a SLM 50336 cross-linker from Wacker. For example, in one embodiment, the surface layer composition includes between 10 weight percent and 28 weight percent of a cross-linker based on the total weight of the surface layer composition. In another embodiment, the surface layer includes between 12 weight percent and 20 weight percent cross-linker. In yet another embodiment, the surface layer includes about 15 weight percent cross-linker based on the total weight of the surface layer composition.

A cross-linker having hydrosilane groups is illustrated in Formula 3 below.

Formula 3

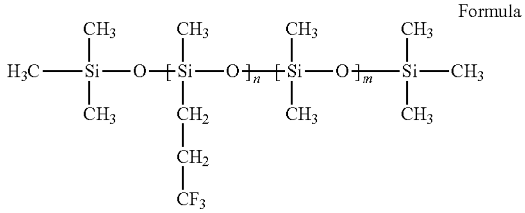

As shown in Formula 3, the cross-linker has hydrosilane groups. In Formula 3, n is from 10 to 100, or n is from 15 to 90, or n is from 18 to 80; and m is from 1 to 50, or m is from 2 to 45 or m is from 3 to 40. The molar ratio of vinyl groups in Part A to hydrosilane groups in the cross-linker in Part B is 0.7:1.0 to about 1.3:1.0, or a molar ratio of from 0.8:1.0 to about 1.2:1.0, or the molar ratio is from about 0.9:1.0 to about 1.1:1.0.

The inhibitor (pt88) may be used in the solution to increase the pot life of the combined solution of Part A and Part B for flow coating.

In embodiments, the solvent of Part B may be butyl acetate, trifluorotoluene, toluene, benzene, methylethylketone, methyl isobutyl ketone, ethyl acetate, propyl acetate, amyl acetate, hexyl acetate and mixtures thereof.

The surface layer 104 (FIG. 2 or FIG. 3) may be coated on the base 102 and barrier layer 105 using any suitable techniques. For example, in one embodiment, the method includes depositing a fluorosilicone surface layer composition by flow coating, ribbon coating or dip coating; and curing the surface layer at an elevated temperature.

In embodiments, the platinum catalyst is added to Part A followed by gentle shaking. Then Part B is added to the Part A solution containing Pt catalyst followed by 5 min of ball milling. The total solid content was controlled by dilution with additional amount of butyl acetate. The dispersion was filtered to remove the stainless steel beads, followed by degassing of the filtered dispersion. The dispersion was then coated over the multilayer base and primer layer. The dispersion could also be molded.

The curing may be performed at an elevated temperature of from about 140° C. to about 180° C., such as about 160° C. This elevated temperature is in contrast to room temperature. The curing may occur for a time period of from about 2 to 6 hours. In some embodiments, the curing time period is between 3 to 5 hours. In one embodiment, the curing time period is about 4 hours. The barrier layer 105 can be designed to block sulfur migration from the base 102 to the surface layer 104 at the chosen curing conditions, such as, for example, at any of the curing temperature ranges and time ranges disclosed herein.

In an embodiment, the present disclosure is directed to a method of making an imaging blanket. The method comprises providing a base 102 comprising a top base layer 114. The top base layer 114 comprises an elastic polymer and sulfur. Any base 102 described herein can be employed. A barrier layer 105 is deposited on the top layer. The barrier layer 105 can be any barrier layer described herein and can be deposited by any suitable method. An elastomer resin comprising a platinum catalyst is deposited on the barrier layer 105 using any suitable method, such as the methods described herein. The elastomer resin is cured to form a surface layer 104. The barrier layer prevents significant migration of sulfur into the surface layer during the curing. The phrase “significant migration of sulfur” is defined herein to mean that greater than 1% by weight of sulfur, as determined by XPS (X-ray photoelectron spectroscopy) migrates from the carcass to the elastomer resin at a curing temperature of 160° C. for 4 hours. In an embodiment, the amount of sulfur migration is less than 1% by weight, such as, for example, about 0.8% to 0%, such as about 0.5% to 0.01%, by weight of sulfur, as determined by XPS (X-ray photoelectron spectroscopy) from the carcass to the elastomer resin at a curing temperature of 160° C. for 4 hours.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

A sulfur containing carcass, which was a ROLLIN® printing blanket available from Trelleborg AB of Trelleborg, Sweden, was used in this example. The carcass was cleaned with isopropyl alcohol and dried. A photocrosslinkable epoxy called SU8-2025 was coated on the carcass by spin coating and was cured by exposure to 365 nm UV radiation and also heating in an oven, thereby forming a barrier layer of thickness ~25 microns. SU8-2000 is a one part photocrosslinkable epoxy commercially available from MicroChem, of Westborough, Ma. ADali fluorosilicone coating comprising carbon black was applied on top of the barrier layer and was cured at 160° C. for 4 hours.

Comparative Example 1

The same carcass used in Example 1, but having no barrier layer, was also coated with the same Dali fluorosilicone coating comprising carbon black. The coating was cured at 160° C. for 4 hours.

The Dali coating of Example 1 cured completely on top of the SU8 epoxy barrier layer. The Dali coating of Comparative Example 1 did not cure on top of carcass without the barrier layer coating and could be easily scraped off.

Example 2

A sulfur containing carcass, which was a ROLLIN® printing blanket available from Trelleborg AB of Trelleborg, Sweden, was used in this example. The carcass was cleaned with isopropyl alcohol and dried. A two-part heat curable epoxy, I2300 from Resin Designs of Woburn, Massachusetts, was spin coated on the carcass. The spin-coating procedure included using a pipette to dispense approximately 5 ml of I2300 diluted mixture (50% I2300; 50% 1,2-Dimethoxyethane, ReagentPlus®, ≥99%, inhibitor-free), followed by spinning the carcass at 1000 RPM. The coating was then dried, following by a hard bake for 3 hours at 150° C. in an oven. The cured coating was a cross-linked epoxy having a thickness of ~25 microns. A Dali fluorosilicone coating comprising carbon black was applied on top of the barrier layer and was cured at 160° C. for 4 hours.

Comparative Example 2

The same carcass used in Example 2, but having no barrier layer, was also coated with the same Dali fluorosilicone coating comprising carbon black. The coating was also cured at 160° C. for 4 hours.

The Dali coating of Example 2 cured completely on top of the 12300 epoxy barrier layer. The Dali coating of Comparative Example 2 did not cure on top of the carcass without the barrier layer coating and could be scraped off easily. It was gooey and did not form a solid film.

Example 3

A sulfur containing carcass, which was a ROLLIN® printing blanket available from Trelleborg AB of Trelleborg, Sweden, was used in this example. The carcass was cleaned with isopropyl alcohol and dried. A RTV (room temperature vulcanization) silicone called Elastosil RT622 from Wacker Chemie was applied to the carcass and cured at 120° C. for 4 hours to give a final barrier layer thickness of ~45 micons. Then a Dali fluorosilicone coating comprising carbon black was applied on top of the barrier layer and was cured at 160° C. for 4 hours.

The Dali coating of Example 3 did not cure on top of the RT622 barrier layer. XPS indicated significant migration of S the through the silicone layer. This shows that to be effective, the barrier layer prevents S from migrating to the top where it can interfere with the curing of Pt catalyzed topcoat. Table 1 shows the XPS data, which indicates that significant amounts of sulfur migrated to the surface when the RT622 barrier layer was used.

TABLE 1

| | Description | S atomic % on surface |
|---|---|---|
| Control | Rollins Substrate as is (no barrier layer) | 2.69 |
| Example 1 | Substrate with Coating 1 (SU8) & heated 160 C. for 30 min | 0.47 |
| Example 2 | Substrate with Coating 2 (12300) & heated | 0.14 |

TABLE 1-continued

| | Description | S atomic % on surface |
|---|---|---|
| | 160 C.-30 min | |
| Example 3 | Substrate with Coating 3 (silicone) & heated 160 C.-30 min | 2.05 |

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. An imaging blanket, comprising:

a base comprising a top layer, the top layer comprising an elastic polymer and sulfur;

a barrier layer on the top layer, the barrier layer comprising an epoxy polymer; and a surface layer on the barrier layer, the surface layer comprising an elastomer and a platinum catalyst.

2. The imaging blanket of claim 1, wherein the base is a multilayer base.

3. The imaging blanket of claim 1, wherein the elastic polymer is nitrile butadiene rubber.

4. The imaging blanket of claim 1, wherein the barrier layer comprises a cross-linked epoxy polymer.

5. The imaging blanket of claim 1, wherein the elastomer is a fluorosilicone elastomer.

6. The imaging blanket of claim 1, wherein the surface layer further comprises one or more infrared absorbing materials selected from the group consisting of carbon black, carbon nanotubes, graphene, graphite, carbon fibers and metal oxides.

7. The imaging blanket of claim 6, wherein the surface layer further comprises silica.

8. The imaging blanket of claim 1, further comprising a primer layer disposed between the base and the barrier layer and a second primer layer disposed between the barrier layer and the surface layer.

9. The imaging blanket of claim 1, wherein the barrier layer has a thickness ranging from about 5 microns to about 100 microns.

10. A variable data lithography system, comprising:

an imaging member comprising an imaging blanket, the imaging blanket comprising:

a base comprising a top layer, the top layer comprising an elastic polymer and sulfur;

a barrier layer on the top layer, the barrier layer comprising an epoxy polymer; and a surface layer on the barrier layer, the surface layer comprising an elastomer and a platinum catalyst;

a fountain solution subsystem configured for applying a layer of fountain solution to the surface layer;

a patterning subsystem configured for selectively removing portions of the fountain solution layer so as to produce a latent image in the fountain solution;

an inking subsystem configured for applying ink over the imaging blanket such that said ink selectively occupies regions of the imaging blanket where fountain solution was removed by the patterning subsystem to thereby produce an inked latent image; and an image transfer subsystem configured for transferring the inked latent image to a substrate.

11. The variable data lithography system of claim 10, wherein the elastomer comprises a platinum catalyzed fluorosilicone.

12. The variable data lithography system of claim 10, wherein the elastic polymer is nitrile butadiene rubber.

13. The variable data lithography system of claim 10, wherein the barrier layer comprises a cross-linked epoxy polymer.

14. The variable data lithography system of claim 10, further comprising a primer layer disposed between the base and the barrier layer and a second primer layer disposed between the barrier layer and the surface layer.

15. The variable data lithography system of claim 10, wherein the barrier layer has a thickness ranging from about 5 microns to about 100 microns.

16. A method of making an imaging blanket, the method comprising:

providing a base comprising a top layer, the top layer comprising an elastic polymer and sulfur;

depositing a barrier layer on the top layer, the barrier layer comprising an epoxy polymer;

depositing an elastomer resin on the barrier layer, the elastomer resin comprising a platinum catalyst; and curing the elastomer resin to form a surface layer.

17. The method of claim 16, wherein the barrier layer prevents significant migration of sulfur into the surface layer during the curing.

18. The method of claim 16, wherein the barrier layer comprises a cross-linked epoxy polymer.

19. The method of claim 16, further comprising depositing a primer layer on the top layer before depositing the barrier layer, and depositing a second primer layer on the barrier layer before depositing the elastomer resin, the first primer layer and the second primer layer comprising a siloxane.

* * * * *